(12) United States Patent
Hamano et al.

(10) Patent No.: US 8,603,594 B2
(45) Date of Patent: Dec. 10, 2013

(54) LIQUID CRYSTAL COMPOSITION AND LIQUID CRYSTAL DISPLAY DEVICE

(75) Inventors: Makoto Hamano, Chiba (JP); Norikatsu Hattori, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 223 days.

(21) Appl. No.: 13/148,049

(22) PCT Filed: Jan. 21, 2010

(86) PCT No.: PCT/JP2010/050686
§ 371 (c)(1), (2), (4) Date: Aug. 5, 2011

(87) PCT Pub. No.: WO2010/090076
PCT Pub. Date: Aug. 12, 2010

(65) Prior Publication Data
US 2011/0291048 A1  Dec. 1, 2011

(30) Foreign Application Priority Data

Feb. 9, 2009  (JP) .................. 2009-027059

(51) Int. Cl.
*C09K 19/12* (2006.01)
*C09K 19/20* (2006.01)
*C09K 19/30* (2006.01)
*C09K 19/34* (2006.01)

(52) U.S. Cl.
USPC ................. 428/1.1; 252/299.61; 252/299.63; 252/299.66; 252/299.67

(58) Field of Classification Search
USPC ............ 428/1.1; 252/299.01, 299.61, 299.62, 252/299.66, 299.67, 299.6, 299.673
See application file for complete search history.

(56) References Cited

U.S. PATENT DOCUMENTS

| | | |
|---|---|---|
| 2008/0246001 A1 | 10/2008 | Hiroaki |
| 2010/0060843 A1 | 3/2010 | Saito et al. |
| 2010/0127213 A1 | 5/2010 | Czanta et al. |
| 2011/0140039 A1* | 6/2011 | Wu et al. .............. 252/299.61 |
| 2012/0032112 A1* | 2/2012 | Czanta et al. .......... 252/299.64 |
| 2012/0141694 A1* | 6/2012 | Matsumoto et al. ........ 428/1.1 |

FOREIGN PATENT DOCUMENTS

| | | |
|---|---|---|
| EP | 1046693 | 10/2000 |
| EP | 1096001 | 5/2001 |
| JP | 2006-199941 | 8/2006 |

* cited by examiner

*Primary Examiner* — Shean C Wu
(74) *Attorney, Agent, or Firm* — Jianq Chyun IP Office

(57) ABSTRACT

Provided is a liquid crystal composition satisfying at least one of characteristics such as a high maximum temperature of a nematic phase, a low minimum temperature of the nematic phase, a small viscosity, a large optical anisotropy, a large dielectric anisotropy, a large specific resistance, high stability to ultraviolet light and high stability to heat, or having a suitable balance regarding at least two of the characteristics. Provided is an AM device having a short response time, a large voltage holding ratio, a large contrast ratio, a long service life, etc. The liquid crystal composition having a nematic phase includes a specific three-ring or four-ring compound having a high maximum temperature and a large dielectric anisotropy as a first component, and a specific compound having a small viscosity or a high maximum temperature of the nematic phase as a second component, and a liquid crystal display device contains the composition.

13 Claims, No Drawings

LIQUID CRYSTAL COMPOSITION AND LIQUID CRYSTAL DISPLAY DEVICE

CROSS-REFERENCE TO RELATED APPLICATION

This application is a 371 of international application of PCT application serial no. PCT/JP2010/050686, filed on Jan. 21, 2010, which claims the priority benefit of Japan application no. 2009-027059, filed on Feb. 9, 2009. The entirety of each of the above-mentioned patent applications is hereby incorporated by reference herein and made a part of this specification.

TECHNICAL FIELD

The invention relates mainly to a liquid crystal composition suitable for use in an active matrix (AM) device and so forth, and an AM device and so forth containing the composition. More specifically, the invention relates to a liquid crystal composition having a positive dielectric anisotropy, and a device that contains the composition and has a mode such as a twisted nematic (TN) mode, an optically compensated bend (OCB) mode, an in-plane switching (IPS) mode or a polymer sustained alignment (PSA) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode and a polymer sustained alignment (PSA) mode. A classification based on a driving mode in the device includes a passive matrix (PM) and an active matrix (AM). The PM is further classified into static, multiplex and so forth, and the AM is classified into a thin film transistor (TFT), a metal-insulator-metal (MIM) and so forth. The TFT is further classified into amorphous silicon and polycrystal silicon. The latter is classified into a high temperature type and a low temperature type according to a production process. A classification based on a light source includes a reflective type utilizing a natural light, a transmissive type utilizing a backlight and a transreflective type utilizing both the natural light and the backlight.

The device contains a liquid crystal composition having suitable characteristics. The liquid crystal composition has a nematic phase. General characteristics of the composition should be improved to obtain an AM device having good general characteristics. Table 1 below summarizes a relationship between two of the general characteristics. The general characteristics of the composition will be explained further based on a commercially available AM device. A temperature range of the nematic phase relates to a temperature range in which the device can be used. A preferred maximum temperature of the nematic phase is 70° C. or higher and a preferred minimum temperature of the nematic phase is −10° C. or lower. A viscosity of the composition relates to a response time in the device. A short response time is preferred for displaying moving images on the device. Accordingly, a small viscosity of the composition is preferred. A small viscosity at a low temperature is further preferred.

TABLE 1

General Characteristics of Composition and AM Device

| No. | General Characteristics of Composition | General Characteristics of AM Device |
| --- | --- | --- |
| 1 | wide temperature range of a nematic phase | wide usable temperature range |
| 2 | small viscosity [1] | short response time |
| 3 | suitable optical anisotropy | large contrast ratio |
| 4 | large positive or negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1] A liquid crystal composition can be injected into a liquid crystal cell in a shorter period of time.

An optical anisotropy of the composition relates to a contrast ratio in the device. A product ($\Delta n \times d$) of the optical anisotropy ($\Delta n$) of the composition and a cell gap (d) of the device is designed so as to maximize the contrast ratio. A suitable value of the product depends on a type of the operating mode. The suitable value is about 0.45 micrometer in a device having a mode such as TN. In the above case, a composition having a large optical anisotropy is preferred for a device having a small cell gap. A large dielectric anisotropy of the composition contributes to a low threshold voltage, a small electric power consumption and a large contrast ratio in the device. Accordingly, the large dielectric anisotropy is preferred. A large specific resistance of the composition contributes to a large voltage holding ratio and a large contrast ratio in the device. Accordingly, a composition having a large specific resistance, at room temperature and also at a high temperature in an initial stage, is preferred. A composition having a large specific resistance, at room temperature and also at a high temperature after using the device for a long time, is preferred. Stability of the composition to ultraviolet light and heat relates to a service life of the liquid crystal display device. In the case where the stability is high, the device has a long service life. Such characteristics are preferred for an AM device used in a liquid crystal projector, a liquid crystal television and so forth.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode. A composition having a positive or negative dielectric anisotropy is used for an AM device having the PSA mode.

Conventional compositions are disclosed in the patent literatures No. 1 to No. 3 as described below.

CITATION LIST

Patent Literature

Patent literature No. 1: WO2008-128623.
Patent literature No. 2: JP-A-2008-255201.
Patent literature No. 3: WO2008-102641.

A desirable AM device has characteristics such as a wide temperature range in which the device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a large optical anisotropy, a large dielectric anisotropy, a large specific resistance and a high stability to ultraviolet light and a high stability to heat.

SUMMARY OF INVENTION

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light and a high stability to heat. Another aim is to provide a liquid crystal composition having a suitable balance regarding at least two of the characteristics. A further aim is to provide a liquid crystal display device containing such a composition. An additional aim is to provide a composition having a suitable optical anisotropy, a large dielectric anisotropy, a high stability to ultraviolet light and so forth, and is to provide an AM device having a short response time, a large voltage holding ratio, a large contrast ratio, a long service life and so forth.

Solution to Problem

The invention concerns a liquid crystal composition that has a nematic phase and includes a mixture of at least one compound selected from the group of compounds represented by formula (1-1), at least one compound selected from the group of compounds represented by formula (1-2) and at least one compound selected from the group of compounds represented by formula (1-3) as a first component, and at least one compound selected from the group of compounds represented by formula (2) as a second component, and concerns a liquid crystal display device containing the composition:

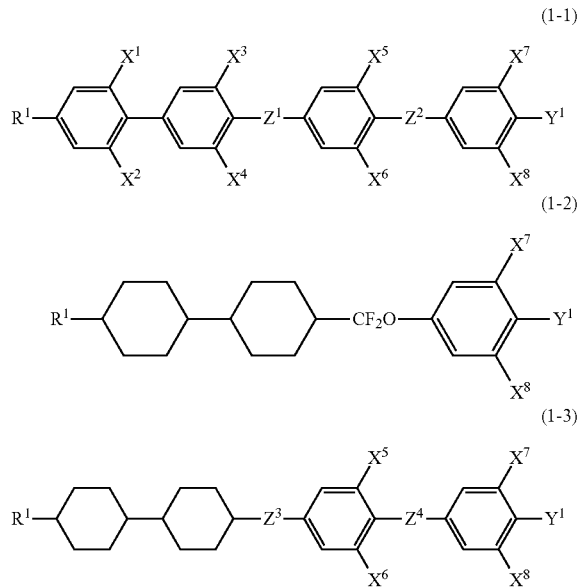

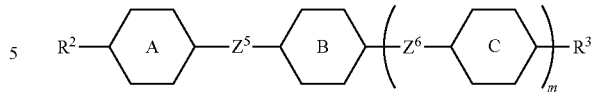

wherein $R^1$ is alkyl having 1 to 12 carbons, alkoxy having 1 to 12 carbons or alkenyl having 2 to 12 carbons; $R^2$ and $R^3$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring A, ring B and ring C are independently 1,4-cyclohexylene, 1,4-phenylene, 2-fluoro-1,4-phenylene or 2,5-difluoro-1,4-phenylene; $Z^1$ and $Z^2$ are independently a single bond, ethylene, carbonyloxy or difluoromethyleneoxy; $Z^3$ and $Z^4$ are independently a single bond, ethylene or carbonyloxy; $X^1$, $X^2$, $X^3$, $X^4$, $X^5$, $X^6$, $X^7$ and $X^8$ are independently hydrogen or fluorine; and $Y^1$ is fluorine, chlorine or trifluoromethoxy; and m is 0, 1 or 2, and in formula (1-1), at least one of $Z^1$ and $Z^2$ is difluoromethyleneoxy.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light and a high stability to heat. One aspect of the invention is a liquid crystal composition having a suitable balance regarding at least two of the characteristics. Another aspect is a liquid crystal display device containing such a composition. A further aspect is a composition having a suitable optical anisotropy, a large dielectric anisotropy, a high stability to ultraviolet light and so forth, and an AM device having a short response time, a large voltage holding ratio, a large contrast ratio, a long service life and so forth.

DESCRIPTION OF EMBODIMENTS

Usage of terms in the specification and claims is as described below. A liquid crystal composition or a liquid crystal display device of the invention may be abbreviated as "composition" or "device," respectively. "Liquid crystal display device" is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound may occasionally be added to the composition. Even in the case where the compound is liquid crystalline, the compound is classified as an additive herein. At least one compound selected from the group of compounds represented by formula (1-1) may be abbreviated as "compound (1-1)" The "compound (1-1)" means one compound, or two or more compounds, represented by formula (1-1). A same rule applies to any other compound represented by any other formula. A term "arbitrary" is used not only in the case where a position is arbitrary but also in the case where the number is arbitrary. However, the term is not used in the case where the number is 0 (zero).

A higher limit of a temperature range of the nematic phase may be abbreviated as "maximum temperature." A lower limit of the temperature range of the nematic phase may be abbreviated as "minimum temperature." An expression "a specific resistance is large" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after using the device for a long time. An expression "a voltage holding ratio is large" means that the device has a large voltage holding ratio at room temperature and also at a temperature close to the maximum temperature of the nematic phase in the initial stage, and that the device has a large voltage holding ratio at room temperature and also at a temperature close to the maximum temperature of the nematic phase even after using the device for a long time. When characteristics such as an optical anisotropy are explained, values obtained according to the measuring methods described in Examples will be used. A first component means one compound, or two or more compounds. A term "a ratio of the first component" is expressed as weight percent (% by weight) of the first component based on a total weight of the liquid crystal composition. A same rule applies to a ratio of the second component and so forth. A ratio of the additive mixed with the composition is expressed as weight percent (% by weight) or weight parts per million (ppm) based on the total weight of the liquid crystal composition.

A symbol $R^1$ is used for a plurality of compounds in chemical formulas of component compounds. Meaning of $R^1$ may be identical or different in two arbitrary compounds among a plurality of the compounds. For example, in one case, $R^1$ of compound (1-1) is ethyl and $R^1$ of compound (1-2) is ethyl. In another case, $R^1$ of compound (1-1) is ethyl and $R^1$ of compound (1-2) is propyl. A same rule applies to a symbol $R^2$, $Y^1$ or the like. A chemical formula "CL" shows chlorine.

The invention includes the items described below.

Item 1. A liquid crystal composition that has a nematic phase and includes a mixture of at least one compound selected from the group of compounds represented by formula (1-1), at least one compound selected from the group of compounds represented by formula (1-2) and at least one compound selected from the group of compounds represented by formula (1-3) as a first component, and at least one compound selected from the group of compounds represented by formula (2) as a second component:

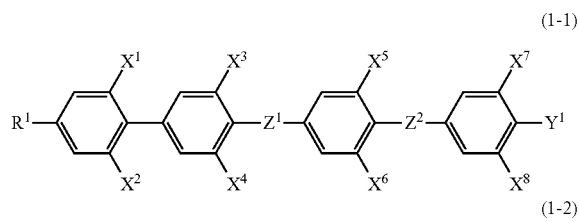

(1-1)

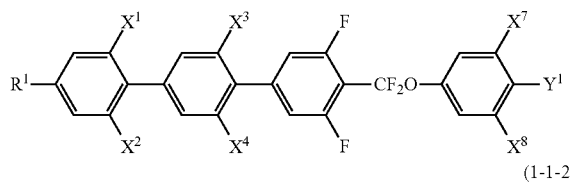

(1-2)

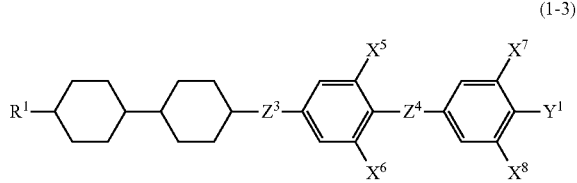

(1-3)

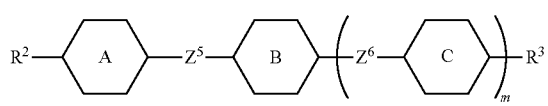

(2)

wherein $R^1$ is alkyl having 1 to 12 carbons, alkoxy having 1 to 12 carbons or alkenyl having 2 to 12 carbons; $R^2$ and $R^3$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring A, ring B and ring C are independently 1,4-cyclohexylene, 1,4-phenylene, 2-fluoro-1,4-phenylene or 2,5-difluoro-1,4-phenylene; $Z^1$, $Z^2$, $Z^3$ and $Z^4$ are independently a single bond, ethylene, carbonyloxy or difluoromethyleneoxy; $Z^5$ and $Z^6$ are independently a single bond, ethylene or carbonyloxy; $X^1$, $X^2$, $X^3$, $X^4$, $X^5$, $X^6$, $X^7$ and $X^8$ are independently hydrogen or fluorine; and $Y^1$ is fluorine, chlorine or trifluoromethoxy; and m is 0, 1 or 2, and in formula (1-1), at least one of $Z^1$ and $Z^2$ is difluoromethyleneoxy.

Item 2. The liquid crystal composition according to item 1, wherein the first component is a mixture of at least one compound selected from the group of compounds represented by formula (1-1-1) and formula (1-1-2), at least one compound selected from the group of compounds represented by formula (1-2), at least one compound selected from the group of compounds represented by formula (1-3-1) and formula (1-3-2)

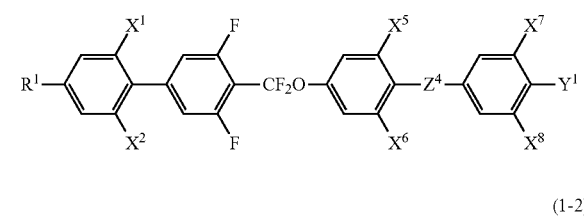

(1-1-1)

(1-1-2)

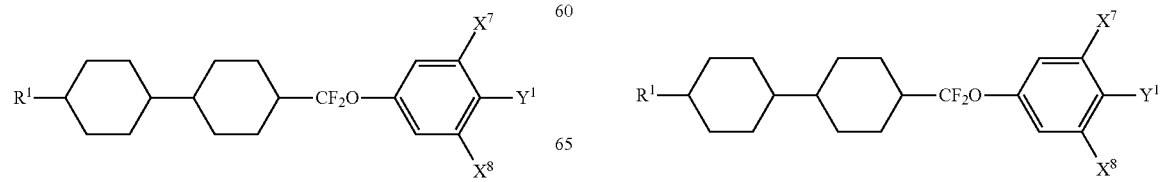

(1-2)

-continued (1-3-1)

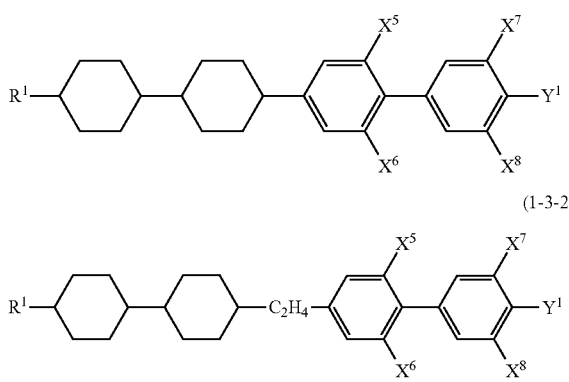

(1-3-2)

wherein $R^1$ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$ and $X^8$ are independently hydrogen or fluorine; and $Y^1$ is fluorine, chlorine or trifluoromethoxy.

Item 3. The liquid crystal composition according to item 2, wherein the first component is a mixture of at least one compound selected from the group of compounds represented by formula (1-1-1), at least one compound selected from the group of compounds represented by and formula (1-1-2), at least one compound selected from the group of compounds represented by formula (1-2), at least one compound selected from the group of compounds represented by formula (1-3-1) and formula (1-3-2).

Item 4. The liquid crystal composition according to any one of items 1 to 3, wherein the second component is at least one compound selected from the group of compounds represented by formula (2-1) to formula (2-10):

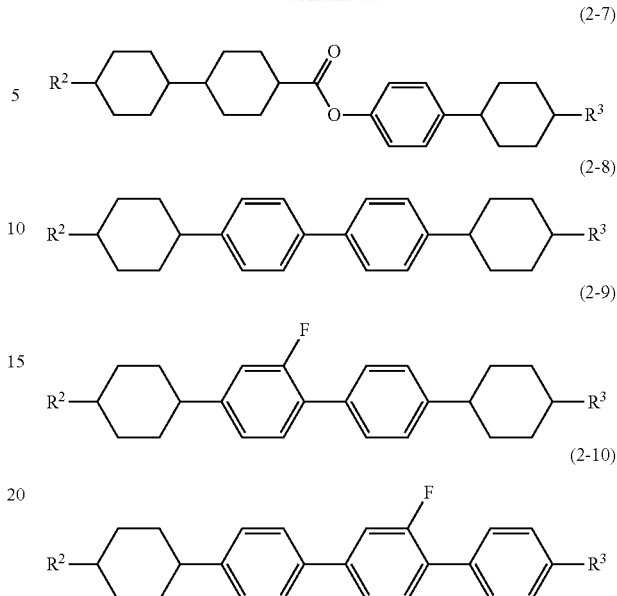

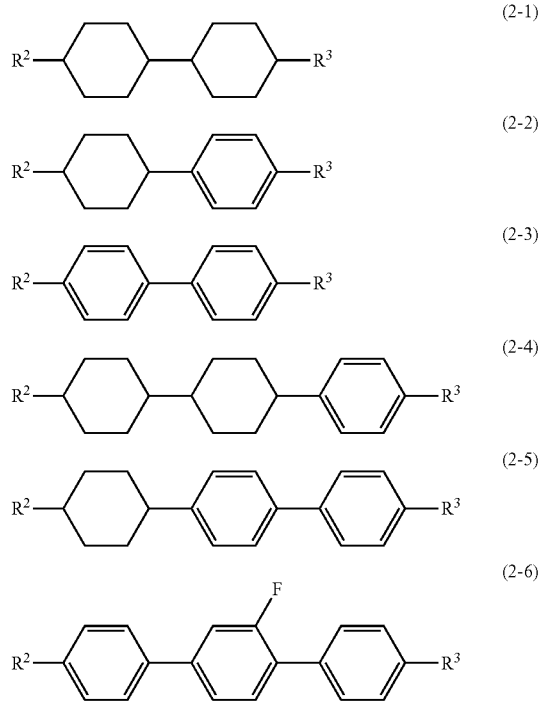

wherein $R^2$ and $R^3$ are alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

Item 5. The liquid crystal composition according to item 4, wherein the second component is at least one compound selected from the group of compounds represented by formula (2-1).

Item 6. The liquid crystal composition according to item 4, wherein the second component is a mixture of at least one compound selected from the group of compounds represented by formula (2-1) and at least one compound selected from the group of compounds represented by formula (2-4).

Item 7. The liquid crystal composition according to item 4, wherein the second component is a mixture of at least one compound selected from the group of compounds represented by formula (2-1) and at least one compound selected from the group of compounds represented by formula (2-6).

Item 8. The liquid crystal composition according to item 4, wherein the second component is a mixture of at least one compound selected from the group of compounds represented by formula (2-6) and at least one compound selected from the group of compounds represented by formula (2-10).

Item 9. The liquid crystal composition according to item 4, wherein the second component is a mixture of at least one compound selected from the group of compounds represented by formula (2-1), at least one compound selected from the group of compounds represented by formula (2-4) and at least one compound selected from the group of compounds represented by formula (2-6).

Item 10. The liquid crystal composition according to any one of items 1 to 9, wherein a ratio of the first component is in the range of 5% by weight to 65% by weight, and a ratio of the second component is in the range of 35% by weight to 85% by weight, based on the total weight of the liquid crystal composition.

Item 11. The liquid crystal composition according to any one of items 1 to 10, further containing at least one compound selected from the group of compounds represented by formula (3) as a third component:

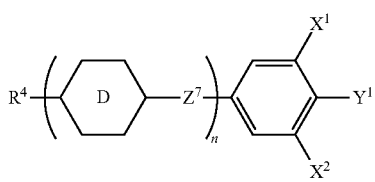

(3)

wherein $R^4$ is alkyl having 1 to 12 carbons or alkenyl having 2 to 12 carbons; ring D is independently 1,4-cyclohexylene, 1,3-dioxane-2,5-diyl, 1,4-phenylene, 2-fluoro-1,4-phenylene, 2,6-difluoro-1,4-phenylene or 2,5-pyrimidine; $Z^7$ is independently a single bond, ethylene, carbonyloxy or difluoromethyleneoxy; $X^1$ and $X^2$ are independently hydrogen or fluorine; $Y^1$ is fluorine, chlorine or trifluoromethoxy; and n is 1 or 2, wherein when n is 2 and both of $Z^7$ are a single bond, at least one of ring D is 1,3-dioxane-2,5-diyl, 1,4-phenylene, 2-fluoro-1,4-phenylene, 2,6-difluoro-1,4-phenylene or 2,5-pyrimidine, and when n is 2 and at least one of $Z^7$ is not a single bond, at least one of ring D is 1,4-phenylene, 2-fluoro-1,4-phenylene or 2,6-difluoro-1,4-phenylene.

Item 12. The liquid crystal composition according to item 11, wherein the third component is at least one compound selected from the group of compounds represented by formula (3-1) to formula (3-12):

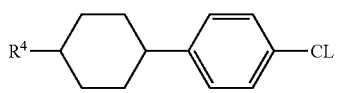

(3-1)

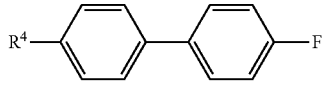

(3-2)

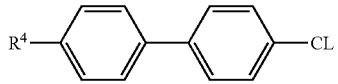

(3-3)

(3-4)

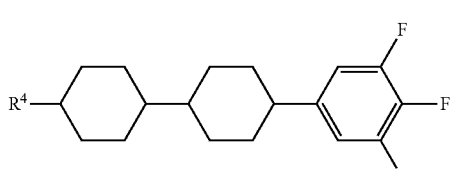

(3-5)

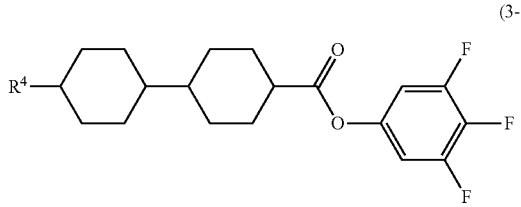

(3-6)

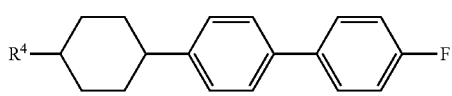

(3-7)

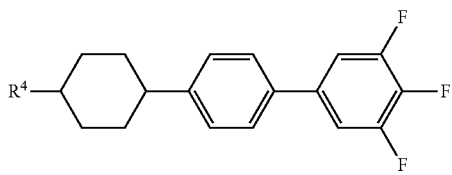

(3-8)

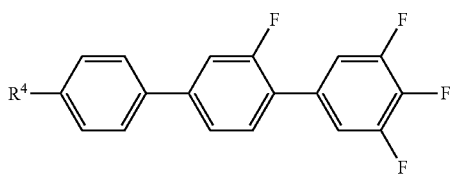

(3-9)

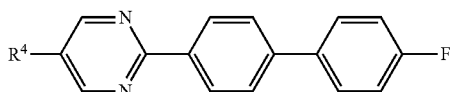

(3-10)

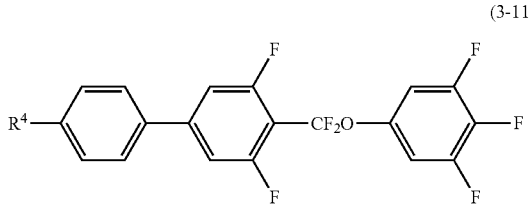

(3-11)

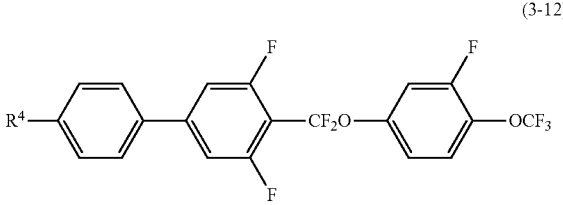

(3-12)

wherein $R^4$ is alkyl having 1 to 12 carbons or alkenyl having 2 to 12 carbons.

Item 13. The liquid crystal composition according to item 12, wherein the third component is at least one compound selected from the group of compounds represented by formula (3-9).

Item 14. The liquid crystal composition according to item 12, wherein the third component is at least one compound selected from the group of compounds represented by formula (3-10).

Item 15. The liquid crystal composition according to item 12, wherein the third component is at least one compound selected from the group of compounds represented by formula (3-11).

Item 16. The liquid crystal composition according to item 12, wherein the third component is a mixture of at least one compound selected from the group of compounds represented by formula (3-5) and at least one compound selected from the group of compounds represented by formula (3-11).

Item 17. The liquid crystal composition according to item 12, wherein the third component is a mixture of at least one compound selected from the group of compounds represented by formula (3-9) and at least one compound selected from the group of compounds represented by formula (3-11).

Item 18. The liquid crystal composition according to any one of items 11 to 17, wherein a ratio of the third component is in the range of 5% by weight to 40% by weight, based on the total weight of the liquid crystal composition.

Item 19. The liquid crystal composition according to any one of items 1 to 18, wherein a maximum temperature of the nematic phase is 70° C. or higher, an optical anisotropy (25° C.) at a wavelength of 589 nanometers is 0.08 or more and a dielectric anisotropy (25° C.) at a frequency of 1 kHz is 2 or more.

Item 20. A liquid crystal display device, containing the liquid crystal composition according to any one of items 1 to 19.

Item 21. The liquid crystal display device according to item 20, wherein an operating mode of the liquid crystal display device is a TN mode, an OCB mode, an IPS mode or a PSA mode, and a driving mode of the liquid crystal display device is an active matrix mode.

The invention further includes the following items: (1) the above-described composition, further containing the optically active compound; (2) the above-described composition, further containing the additive such as an antioxidant, an ultraviolet absorber and an antifoaming agent; (3) an AM device containing the above-described composition; (4) a device that contains the above-described composition and has the TN, ECB, OCB, IPS or PSA mode; (5) a transmissive device containing the above-described composition; (6) use of the above-described composition as the composition having the nematic phase; and (7) use as an optically active composition prepared by addition of the optically active compound to the above-described composition.

The composition of the invention will be explained in the order as described below. First, a constitution of the component compounds in the composition will be explained. Second, main characteristics of the component compounds and main effects of the compounds on the composition will be explained. Third, a combination of components in the composition, a preferred ratio of the component compounds and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds of the composition will be explained. The composition of the invention is classified into composition A and composition B. The composition A may further contain any other liquid crystal compound, additive and impurity. "Any other liquid crystal compound" means a liquid crystal compound different from the compound (1-1) to the compound (1-3), the compound (2) and the compound (3). Such a compound is mixed with the composition for the purpose of further adjusting the characteristics of the composition. Of any other liquid crystal compound, a smaller amount of a cyano compound is preferred in view of stability to heat or ultraviolet light. A further preferred ratio of the cyano compound is 0% by weight. The additive includes the optically active compound, the antioxidant, the ultraviolet absorber, a coloring matter, the antifoaming agent, the polymerizable compound and the polymerization initiator. The impurity includes a compound mixed in a process such as preparation of the component compounds. Even in the case where the compound is liquid crystalline, the compound is classified as the impurity herein.

The composition B consists essentially of compounds selected from the group of the compound (1-1) to the compound (1-3), the compound (2) and the compound (3). A term "essentially" means that the composition may also contain the additive and the impurity, but does not contain any liquid crystal compound different from the above compounds. The composition B has a smaller number of components than the composition A. The composition B is preferred to the composition A in view of cost reduction. The composition A is preferred to the composition B in view of capability of further adjusting physical properties by mixing any other liquid crystal compound.

Second, the main characteristics of the component compounds and the main effects of the compounds on the characteristics of the composition will be explained. Table 2 summarizes the main characteristics of the component compounds on the basis of advantageous effects of the invention. In Table 2, a symbol L stands for "large" or "high," a symbol M stands for "medium," and a symbol S stands for "small" or "low." The symbols L, M and S are classified according to a qualitative comparison among the component compounds, and 0 (zero) means that "a value is nearly zero."

TABLE 2

| Characteristics of Compound | | | |
| --- | --- | --- | --- |
| Compound | Compound (1-1) to Compound (1-3) | Compound (2) | Compound (3) |
| Maximum Temperature | M | S-L | S-M |
| Viscosity | M-L | S-L | M-L |
| Optical Anisotropy | M-L | S-L | M-L |
| Dielectric Anisotropy | L | 0 | S-L |
| Specific Resistance | L | L | L |

Upon mixing the component compounds with the composition, the main effects of the component compounds on the characteristics of the composition are as described below. The compound (1-1) to the compound (1-3) increases the maximum temperature and the optical anisotropy and increases the dielectric anisotropy. The compound (2) increases the maximum temperature or decreases viscosity. The compound (3) decreases the minimum temperature and increases the dielectric anisotropy.

Third, the combination of the components in the composition, the preferred ratio of the component compounds and the basis thereof will be explained. The combination of the components in the composition includes a combination of the first component and the second component and a combination of the first component, the second component and the third component.

A preferred ratio of the first component is 5% by weight or more for increasing the optical anisotropy and the dielectric anisotropy, and 65% by weight or less for decreasing the minimum temperature. A further preferred ratio is in the range of 5% by weight to 40% by weight. A particularly preferred ratio is in the range of 5% by weight to 30% by weight.

A preferred ratio of the second component is 35% by weight or more for increasing the maximum temperature or decreasing the viscosity, and 85% by weight or less for increasing the dielectric anisotropy. A further preferred ratio is in the range of 40% by weight to 80% by weight. A particularly preferred ratio is in the range of 45% by weight to 80% by weight.

The third component is suitable for use in preparing a composition having a particularly large dielectric anisotropy. A preferred ratio of the third component is in the range of 5% by weight to 40% by weight. A further preferred ratio is in the range of 5% by weight to 30% by weight. A particularly preferred ratio is in the range of 5% by weight to 20% by weight.

Fourth, the preferred embodiment of the component compounds will be explained. $R^1$ is alkyl having 1 to 12 carbons, alkoxy having 1 to 12 carbons or alkenyl having 2 to 12 carbons. Preferred $R^2$ is alkyl having 1 to 12 carbons for increasing the stability to ultraviolet light or heat, or the like. $R^2$ and $R^3$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine. Preferred $R^2$ is alkenyl having 2 to 12 carbons for decreasing the minimum temperature or decreasing the viscosity. Preferred $R^3$ is alkyl having 1 to 12 carbons for increasing the stability to ultraviolet light or heat, or the like. $R^4$ is alkyl having 1 to 12 carbons or alkenyl having 2 to 12 carbons. Preferred $R^4$ is alkyl having 1 to 12 carbons for increasing the stability to ultraviolet light or heat, or the like.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration for —CH=CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. C is preferred in the alkenyl such as 2-butenyl, 2-pentenyl and 2-hexenyl. In the alkenyl, straight-chain alkenyl is preferred to branched-chain alkenyl.

Preferred examples of alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Ring A, ring B and ring C are independently 1,4-cyclohexylene, 1,4-phenylene, 2-fluoro-1,4-phenylene or 2,5-difluoro-1,4-phenylene, and two of ring C when m is 2 may be identical or different. In the case of 1,4-phenylene, any of both directions may be allowed. Preferred ring A, ring B or ring C is 1,4-cyclohexylene for decreasing the viscosity, and 1,4-phenylene for increasing the optical anisotropy. Ring D is 1,4-cyclohexylene, 1,3-dioxane-2,5-diyl, 1,4-phenylene, 2-fluoro-1,4-phenylene, 2,6-difluoro-1,4-phenylene or 2,5-pyrimidine, and two of arbitrary ring D when n is 2 or 3 may be identical or different. At least one of ring ID when n is 2 and both of $Z^7$ are a single bond is 1,3-dioxane-2,5-diyl, 1,4-phenylene, 2-fluoro-1,4-phenylene, 2,6-difluoro-1,4-phenylene or 2,5-pyrimidine. At least one of ring D when n is 2 and at least one of $Z^7$ is not a single bond is 1,4-phenylene, 2-fluoro-1,4-phenylene or 2.6-difluoro-1,4-phenylene. When ring ID is 1,3-dioxane-2,5-diyl, 2-fluoro-1,4-phenylene, 2,6-difluoro-1,4-phenylene or 2,5-pyrimidine, any of both directions may be allowed, respectively. Preferred ring D is 1,4-phenylene for increasing the optical anisotropy.

$Z^1$, $Z^2$ and $Z^7$ are independently a single bond, ethylene, carbonyloxy or difluoromethyleneoxy. Two of $Z^7$ when n is 2 in formula (3) may be identical or different. Then, at least one of $Z^1$ and $Z^2$ in formula (1-1) is difluoromethyleneoxy. Preferred $Z^1$, $Z^2$ or $Z^7$ is difluoromethyleneoxy for increasing the dielectric anisotropy. $Z^5$ and $Z^6$ are independently a single bond, ethylene or carbonyloxy, and two of $Z^6$ when m is 2 may be identical or different. Preferred $Z^5$ or $Z^6$ is a single bond for decreasing the viscosity.

$X^1$, $X^2$, $X^3$, $X^4$, $X^5$, $X^6$, $X^7$ and $X^8$ are independently hydrogen or fluorine. Preferred $X^1$, $X^2$, $X^3$, $X^4$, $X^5$, $X^6$, $X^7$ or $X^8$ is fluorine for increasing the dielectric anisotropy and hydrogen for increasing the maximum temperature.

$Y^1$ is fluorine, chlorine or trifluoromethoxy. Preferred $Y^1$ is fluorine for decreasing the minimum temperature.

Then, m is 0, 1 or 2. Preferred m is 0 for decreasing the viscosity and 2 for increasing the maximum temperature.

Then, n is 1, 2 or 3. Preferred n is 1 for decreasing the minimum temperature and 3 for increasing the maximum temperature.

Fifth, the specific examples of the component compounds will be shown. In the preferred compounds described below, $R^5$ is straight-chain alkyl having 1 to 12 carbons. $R^6$ is straight-chain alkyl having 1 to 12 carbons or straight-chain alkoxy having 1 to 12 carbons. $R^7$ and $R^8$ are independently straight-chain alkyl having 1 to 12 carbons or straight-chain alkenyl having 2 to 12 carbons. With regard to a configuration for 1,4-cyclohexylene in the compounds, trans is preferred to cis for increasing the maximum temperature.

Preferred compound (1-1) to compound (1-3) includes compound (1-1-1-1) to compound (1-1-1-2), compound (1-1-2-1) to compound (1-1-2-4), compound (1-2), compound (1-3-1-1) to compound (1-3-1-2) and compound (1-3-2-1) to compound (1-3-2-2). Further preferred compound (1-1) to compound (1-3) includes compound (1-1-1-2), compound (1-1-2-2), compound (1-1-2-4), compound (1-2-1), compound (1-3-1-2) and compound (1-3-2-2). Particularly preferred compound (1-1) to compound (1-3) includes compound (1-1-1-2), compound (1-1-2-4), compound (1-2-1) and compound (1-3-1-1). Preferred compound (2) includes compound (2-1-1) to compound (2-10-1). Further preferred compound (2) includes compound (2-1-1), compound (2-3-1), compound (2-4-1), compound (2-6-1) and compound (2-10-1). Particularly preferred compound (2) is compound (2-1-1), compound (2-4-1) and compound (2-6-1). Preferred compound (3) includes compound (3-1-1) to compound (3-12-1), and compound (3-13) to compound (3-17). Further preferred compound (3) includes compound (3-1-1), compound (3-5-1), compound (3-8-1), compound (3-9-1) and compound (3-11-1). Particularly preferred compound (3) includes compound (3-5-1), compound (3-9-1) and compound (3-11-1).

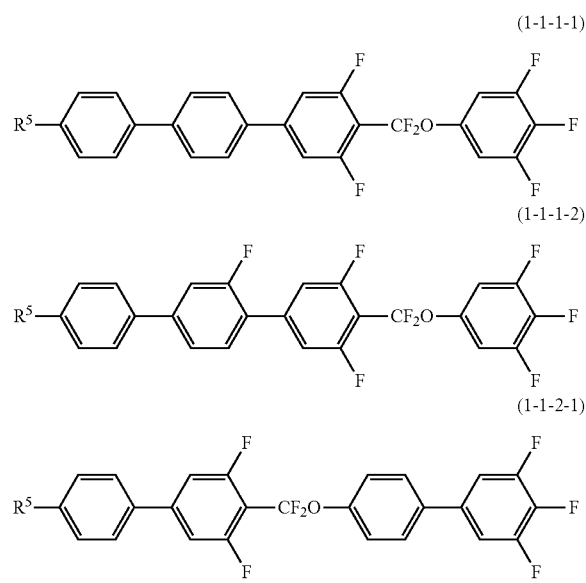

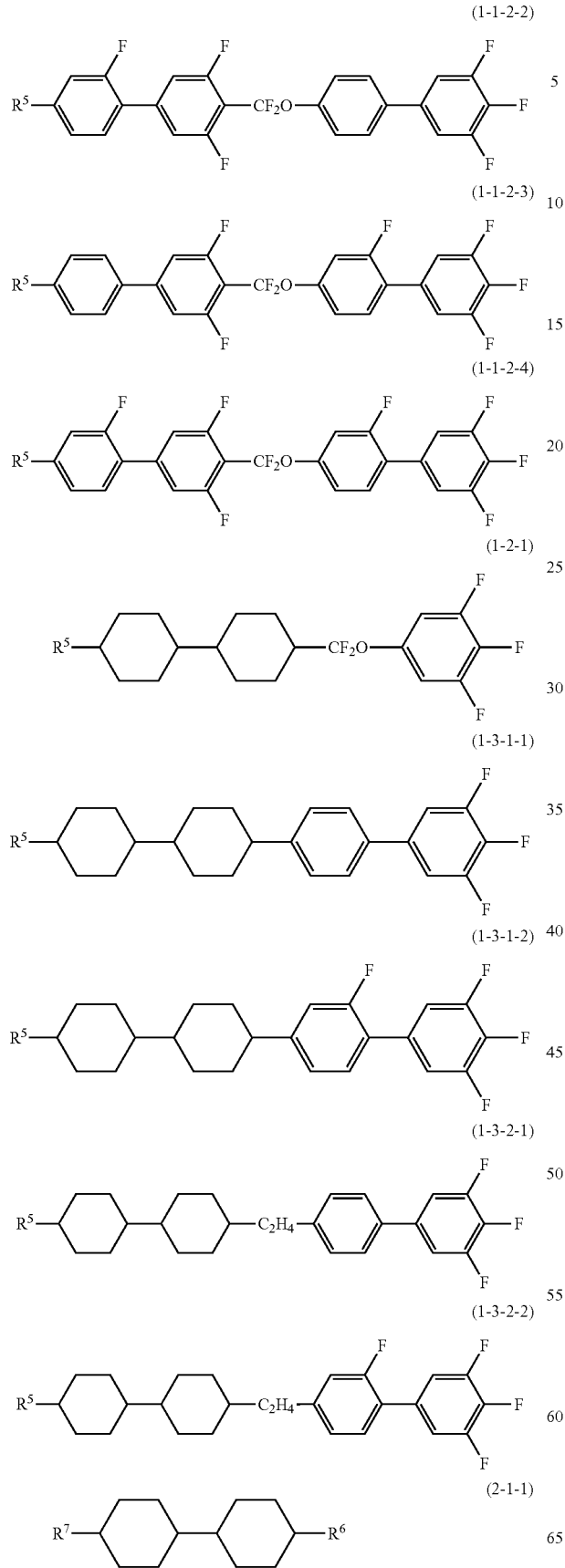
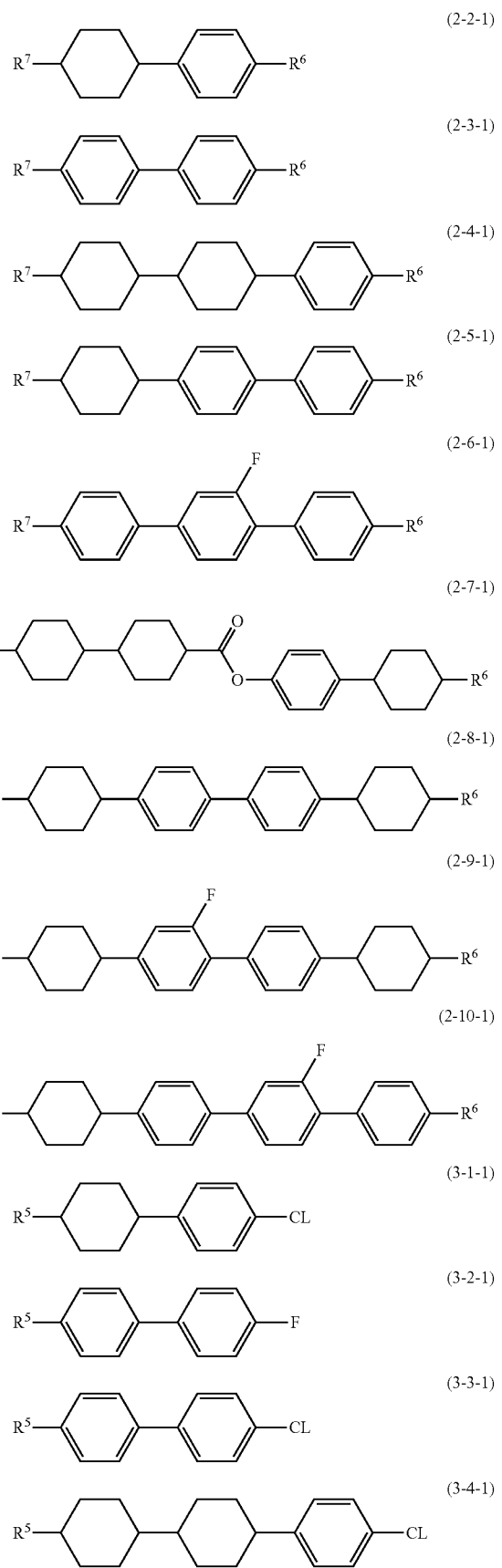

(3-5-1) 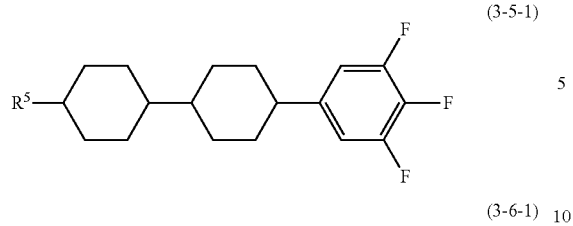

(3-6-1) 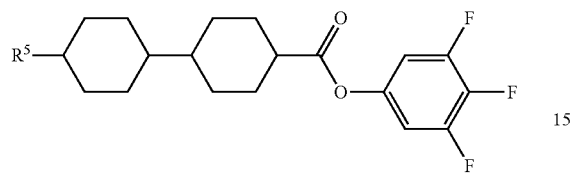

(3-7-1) 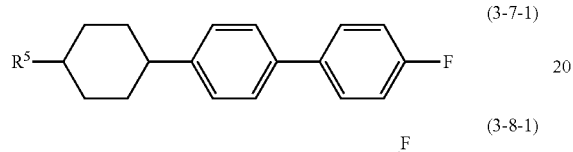

(3-8-1) 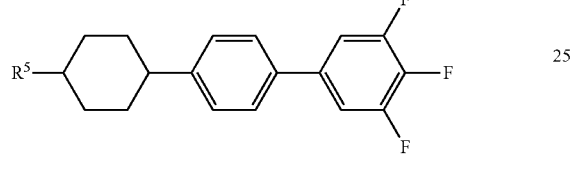

(3-9-1) 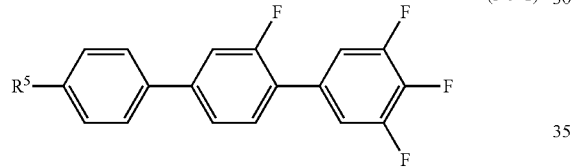

(3-10-1) 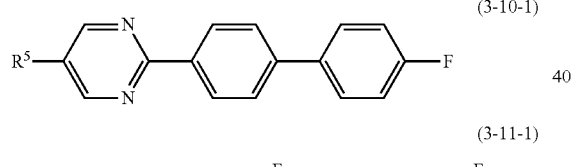

(3-11-1) 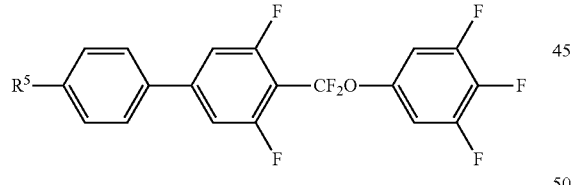

(3-12-1) 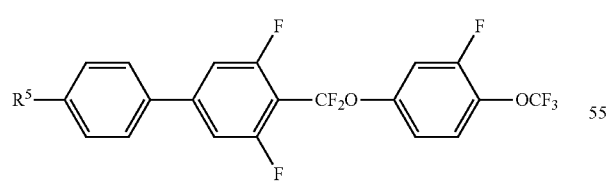

(3-13) 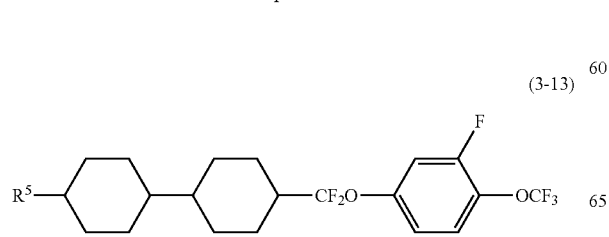

(3-14) 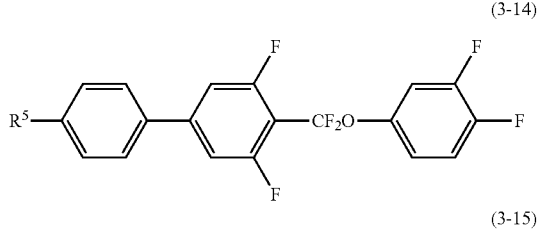

(3-15) 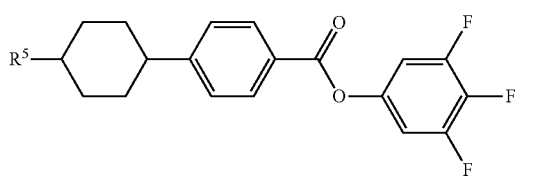

(3-16) 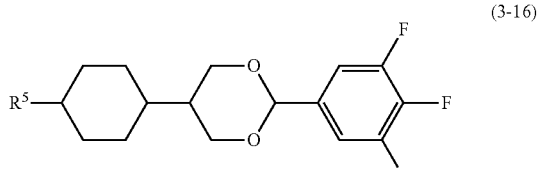

(3-17) 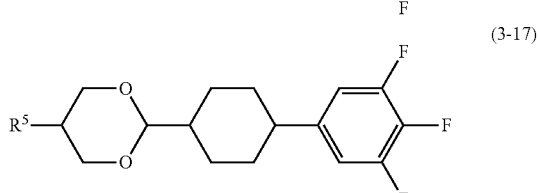

Sixth, the additive which may be mixed with the composition will be explained. Such an additive includes the optically active compound, the antioxidant, the ultraviolet absorber, the coloring matter, the antifoaming agent, the polymerizable compound and the polymerization initiator. The optically active compound is mixed with the composition for the purpose of inducing a helical structure and giving a twist angle in liquid crystals. Examples of such a compound include compound (4-1) to compound (4-4). A preferred ratio of the optically active compound is 5% by weight or less. A further preferred ratio is in the range of 0.01% by weight to 2% by weight.

(4-1) 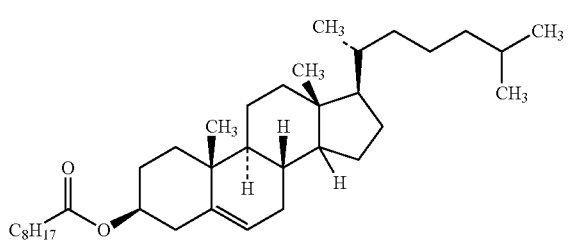

(4-2) 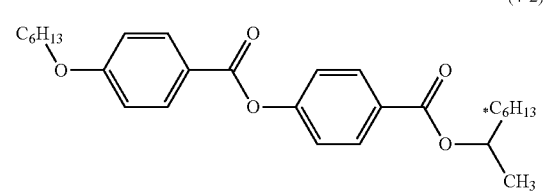

-continued

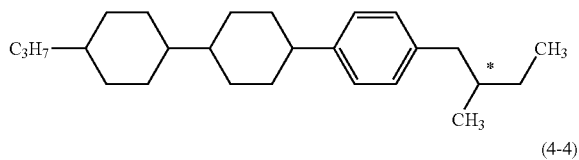

(4-3)

(4-4)

The antioxidant is mixed with the composition for the purpose of preventing a decrease in specific resistance caused by heating in air, or maintaining a large voltage holding ratio at room temperature and also at a temperature close to the maximum temperature of the nematic phase after using the device for a long time.

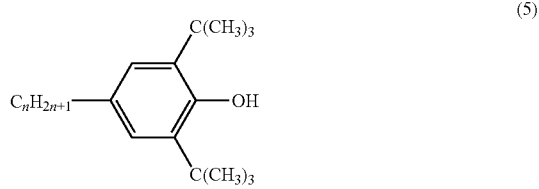

(5)

Preferred examples of the antioxidant include compound (5) where n is an integer from 1 to 9. In the compound (5), preferred n is 1, 3, 5, 7 or 9. Further preferred n is 1 or 7. The compound (5) where n is 1 is effective in preventing a decrease in specific resistance caused by heating in air because the compound (5) has a large volatility. The compound (5) where n is 7 is effective in maintaining a large voltage holding ratio at room temperature and also at a temperature close to the maximum temperature after using the device for a long time because the compound (5) has a small volatility. A preferred ratio of the antioxidant is 50 ppm or more for achieving the effect thereof, and 600 ppm or less for avoiding a decrease in maximum temperature or avoiding an increase in minimum temperature. A further preferred ratio is in the range of 100 ppm to 300 ppm.

Preferred examples of the ultraviolet absorber include a benzophenone derivative, a benzoate derivative and a triazole derivative. A light stabilizer such as an amine having steric hindrance is also preferred. A preferred ratio of the ultraviolet absorber or the light stabilizer is 50 ppm or more for achieving the effect thereof, and 10,000 ppm or less for avoiding a decrease in maximum temperature or avoiding an increase in minimum temperature. A further preferred ratio is in the range of 100 ppm to 10,000 ppm.

A dichroic dye such as an azo dye or an anthraquinone dye is mixed with the composition for adjusting to a device having a guest host (GH) mode. A preferred ratio of the coloring matter is in the range of 0.01% by weight to 10% by weight. The antifoaming agent such as dimethyl silicone oil or methyl phenyl silicone oil is mixed with the composition for preventing foam formation. A preferred ratio of the antifoaming agent is 1 ppm or more for achieving the effect thereof, and 1,000 ppm or less for avoiding a poor display. A further preferred ratio is in the range of 1 ppm to 500 ppm.

The polymerizable compound is mixed with the composition for adjusting to a device having a polymer sustained alignment (PSA) mode. Preferred examples of the polymerizable compound include a compound having a polymerizable group, such as acrylate, methacrylate, vinyl compound, vinyloxy compound, propenyl ether, epoxy compound (oxirane, oxetane) and vinyl ketone. Particularly preferred examples include an acrylate derivative and a methacrylate derivative. A preferred ratio of the polymerizable compound is 0.05% by weight or more for achieving the effect thereof, and 10% by weight or less for avoiding a poor display. A further preferred ratio is in the range of 0.1% by weight to 2% by weight. The polymerizable compound is polymerized by irradiation with ultraviolet light or the like, preferably, in the presence of a suitable initiator such as a photopolymerization initiator. Suitable conditions for polymerization, suitable types of the initiator and the suitable amounts thereof are known to a person skilled in the art and are described in literatures. For example, Irgacure 651 (registered trademark), Irgacure 184 (registered trademark) or Darocure 1173 (registered trademark) (Ciba Japan K.K.), each being the photopolymerization initiator, is suitable for radical polymerization. The polymerizable compound includes the photopolymerization initiator, preferably, in the range of 0.1% by weight to 5% by weight, particularly preferably, in the range of 1% by weight to 3% by weight.

Seventh, the methods for synthesizing the component compounds will be explained. The compounds can be prepared according to known methods. The methods for synthesizing the compounds will be exemplified. The compound (1-1-1-2) and the compound (3-11-1) are prepared by the method described in JP-A-H10-251186 (1998). The compound (2-1-1) and the compound (2-4-1) are prepared by the method described in JP-B-H4-30382 (1990). The compound (3-5-1) and the compound (3-8-1) are prepared by the method described in JP-A-H2-233626 (1990). The antioxidant is commercially available. The compound represented by formula (5) where n is 1 is available from Sigma-Aldrich Corporation. The compound (5) where n is 7 or the like is prepared according to the method described in U.S. Pat. No. 3,660,505.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.). The composition is prepared according to known methods using the compounds thus obtained. For example, the component compounds are mixed and dissolved in each other by heating.

Last, the application of the composition will be explained. Most of the composition has a minimum temperature of −10° C. or lower, a maximum temperature of 70° C. or higher, and an optical anisotropy in the range of 0.07 to 0.20. A device containing the composition has a large voltage holding ratio. The composition is suitable for use in the AM device. The composition is particularly suitable for use in a transmissive AM device. A composition having the optical anisotropy in the range of 0.08 to 0.25 and further a composition having the optical anisotropy in the range of 0.10 to 0.30 may be prepared by adjusting the ratio of the component compounds or by mixing any other liquid crystal compound. The composition can be used as the composition having the nematic phase and as the optically active composition by adding the optically active compound.

The composition can be used for the AM device, and also for a PM device. The composition can also be used for an AM device and a PM device having the mode such as PC, TN, STN, ECB, OCB, IPS, VA or PSA. Use for the AM device having the TN, OCB or IPS mode is particularly preferred. The device may be of a reflective type, a transmissive type or a transreflective type. Use for the transmissive device is preferred. The composition can be also used for an amorphous silicon-TFT device or a polycrystal silicon-TFT device. The composition is also usable for a nematic curvilinear aligned phase (NCAP) device prepared by microencapsulating the composition, and for a polymer dispersed (PD) device in which a three-dimensional network-polymer is formed in the composition.

EXAMPLES

In order to evaluate characteristics of a composition or a compound to be contained in the composition, the composition and the compound are made as a measurement object. When the measurement object was the composition, the composition was measured as is, and values obtained were described. When the measurement object was the compound, a sample for measurement was prepared by mixing the compound (15% by weight) into mother liquid crystals (85% by weight). Characteristic values of the compound were calculated from the values obtained by measurement, according to an extrapolation method: (extrapolated value)=[(measured value of a sample for measurement)-0.85×(measured value of mother liquid crystals)]/0.15. When a smectic phase (or crystals) precipitated at the ratio thereof at 25° C., a ratio of the compound to the mother liquid crystals was changed step by step in the order of (10% by weight:90% by weight), (5% by weight:95% by weight) and (1% by weight:99% by weight). Values of a maximum temperature, an optical anisotropy, viscosity and a dielectric anisotropy with regard to the compound were obtained according to the extrapolation method.

The components of the mother liquid crystals were as described below. A ratio of each component is expressed as % by weight.

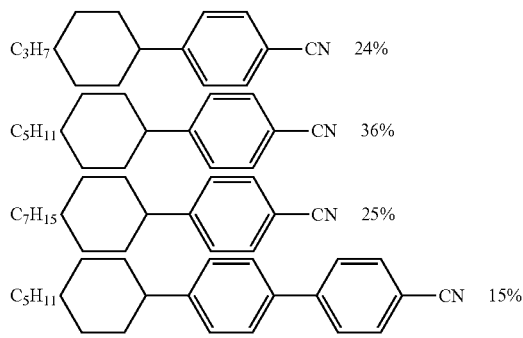

The characteristics were measured according to the methods described below. Most of the methods are applied as described in EIAJ ED-2521A of the Standard of Electronic Industries Association of Japan, or modified thereon.

Maximum Temperature of a Nematic Phase (NI; ° C.):

A sample was placed on a hot plate in a melting point apparatus equipped with a polarizing microscope and was heated at a rate of 1° C. per minute. A temperature when a part of the sample began to change from a nematic phase to an isotropic liquid was measured. A higher limit of a temperature range of the nematic phase may be abbreviated as "maximum temperature."

Minimum Temperature of a Nematic Phase ($T_c$; ° C.):

A sample having a nematic phase was put in glass vials and then kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c \leq -20°$ C. A lower limit of a temperature range of the nematic phase may be abbreviated as "minimum temperature."

Viscosity (bulk viscosity; η; measured at 20° C.; mPa·s):

A cone-plate (E type) viscometer was used for measurement.

Viscosity (rotational viscosity; γ1; measured at 25° C.; mPa·s):

Measurement was carried out according to the method described in M. Imai et al., Molecular Crystals and Liquid Crystals, Vol. 259, p. 37 (1995). A sample was placed in a device having a twist angle of 0 degree, and a distance (cell gap) between two glass substrates of 5 micrometers. A voltage was stepwise applied to a TN device in the range of 16 V to 19.5 V at an increment of 0.5 V. After a period of 0.2 second with no voltage application, application was repeated under the conditions of only one rectangular wave (rectangular pulse; 0.2 second) and no application (2 seconds). A peak current and a peak time of a transient current generated by the application were measured. A value of the rotational viscosity was obtained from the measured values and a calculation equation (8) on page 40 of the paper presented by M. Imai et al. A value of a dielectric anisotropy necessary for the present calculation was obtained using the device used for measuring the rotational viscosity, according to the method described below.

Optical Anisotropy (refractive index anisotropy; Δn; measured at 25° C.):

Measurement was carried out by means of Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=4∥−n⊥.

Dielectric Anisotropy (Δ∈; measured at 25° C.):

A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of liquid crystal molecules was measured. A value of dielectric anisotropy was calculated from an equation: Δ∈=∈∥−∈⊥.

Threshold Voltage (Vth; measured at 25° C.; V):

An LCD-5100 luminance meter made by Otsuka Electronics Co., Ltd. was used for measurement. A light source was a halogen lamp. A sample was put in a TN device having a normally white mode, the TN device in which a distance (cell gap) between two glass substrates was about 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light in a perpendicular direction, and the amount of light passing through the device was measured. A voltage-transmittance curve was prepared, in which the maximum amount of light corresponds to 100% transmittance and the minimum amount of light corresponds to 0% transmittance. A threshold voltage is a voltage at 90% transmittance.

Voltage Holding Ratio (VHR-1; measured at 25° C.; %):

A TN device used for measurement had a polyimide-alignment film, and a distance (cell gap) between two glass substrates was 5 micrometers. A sample was put in the device, and then the device was sealed with a UV-polymerizable adhesive. A pulse voltage (60 microseconds at 5 V) was applied to the TN device and the device was charged. A decreasing voltage was measured for 16.7 milliseconds with a high-speed voltmeter, and area A between a voltage curve and a horizontal axis in a unit cycle was obtained. Area B was an area without a decrease. A voltage holding ratio is a percentage of the area A to the area B.

Voltage Holding Ratio (VHR-2; measured at 80° C.; %):

A TN device used for measurement had a polyimide-alignment film, and a distance (cell gap) between two glass substrates was 5 micrometers. A sample was put in the device, and then the device was sealed with a UV-polymerizable adhesive. A pulse voltage (60 microseconds at 5 V) was applied to the TN device and the device was charged. A decreasing voltage was measured for 16.7 milliseconds with a high-speed voltmeter and area A between a voltage curve and a horizontal axis in a unit cycle was obtained. Area B was an area without a decrease. A voltage holding ratio is a percentage of the area A to the area B.

Voltage Holding Ratio (VHR-3; measured at 25° C.; %):

Stability to ultraviolet light was evaluated by measuring a voltage holding ratio after irradiation with ultraviolet light. A composition having a large VHR-3 had a high stability to ultraviolet light. A TN device used for measurement had a polyimide-alignment film and a cell gap was 5 micrometers. A sample was put in the device, and then the device was irradiated with light for 20 minutes. A light source was an ultra high-pressure mercury lamp USH-500D (made by Ushio, Inc.), and a distance between the device and the light source was 20 centimeters. In measuring VHR-3, a decreasing voltage was measured for 16.7 milliseconds. A value of VHR-3 is, preferably, in the range of 90% or more, further preferably, 95% or more.

Voltage Holding Ratio (VHR-4; measured at 25° C.; %):

A TN device into which a sample was poured was heated in a constant-temperature bath at 80° C. for 500 hours, and then stability to heat was evaluated by measuring a voltage holding ratio. A composition having a large VHR-4 has a high stability to heat. In measuring VHR-4, a decreasing voltage was measured for 16.7 milliseconds.

Response Time (τ; measured at 25° C.; millisecond):

An LCD-5100 luminance meter made by Otsuka Electronics Co., Ltd. was used for measurement. A light source was a halogen lamp. A low-pass filter was set at 5 kHz. A sample was put in a TN device having a normally white mode, the TN device in which a cell gap between two glass substrates was 5.0 micrometers and a twist angle was 80 degrees. Rectangular waves (60 Hz, 5 V, 0.5 second) were applied to the device. On the occasion, the device was irradiated with light in a perpendicular direction, and the amount of light passing through the device was measured. The maximum amount of light corresponds to 100% transmittance, and the minimum amount of light corresponds to 0% transmittance. A rise time (τr: rise time; millisecond) is time required for a change from 90% transmittance to 10% transmittance. A fall time (τf: fall time; millisecond) is time required for a change from 10% transmittance to 90% transmittance. A response time is a sum of the rise time and the fall time thus obtained.

Specific Resistance (ρ; measured at 25° C.; Ωcm):

A sample of 1.0 milliliter was put in a vessel equipped with electrodes. A DC voltage (10V) was applied to the vessel, and a DC current after 10 seconds was measured. A specific resistance was calculated from the following equation: (specific resistance)=[(voltage)×(electric capacity of vessel)]/[(DC current)×(dielectric constant in vacuum)].

Gas Chromatographic Analysis:

GC-14B gas chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was further heated to 280° C. at a rate of 5° C. per minute. A sample was prepared in acetone (0.1% by weight), and then 1 microliter of the solution was injected into the sample injector. A recorder used was C—R5A Chromatopac made by Shimadzu Corporation or an equivalent thereof. The resulting gas chromatogram showed a retention time of a peak and a peak area corresponding to each of the component compounds.

As a solvent for diluting a sample, chloroform, hexane and so forth may also be used. The following capillary columns may also be used for separating component compounds: HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds to be contained in a composition may be calculated according to the method described below. The liquid crystal compounds can be detected by means of a gas chromatograph. A ratio of peak areas in the gas chromatogram corresponds to the ratio (in number of moles) of the liquid crystal compounds. When the capillary columns described above were used, a correction coefficient of each of the liquid crystal compounds may be regarded as 1 (one). Accordingly, the ratio (% by weight) of the liquid crystal compounds was calculated from the ratio of the peak areas.

The invention will be explained in detail by way of Examples. The invention is not limited by the Examples described below. The compounds described in Comparative Examples and Examples were expressed as symbols according to definitions in Table 3 described below. In Table 3, a configuration for 1,4-cyclohexylene is trans. A parenthesized number next to a symbolized compound in Examples corresponds to the number of the compound. A symbol (−) means any other liquid crystal compound. A ratio (percent) of liquid crystal compounds is expressed as weight percent (% by weight) based on the total weight of the liquid crystal composition. The liquid crystal composition further includes an impurity in addition thereto. Last, the characteristic values of the composition are summarized.

TABLE 3

Method for Description of Compounds using Symbols
R—(A₁)—Z₁— · · · ·—Zₙ—(Aₙ)—R'

1) Left-terminal Group R—

| R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2=CH$— | V— |
| $C_nH_{2n+1}$—CH=CH— | nV— |
| $CH_2=CH$—$C_nH_{2n}$— | Vn- |
| $C_mH_{2m+1}$—CH=CH—$C_nH_{2n}$— | mVn- |
| $CH_2=CH$—$C_2H_4$—CH=CH—$C_2H_4$— | V2V2— |
| $CF_2=CH$— | VFF— |
| $CF_2=CH$—$(CH_2)_2$— | VFF2— |

2) Right-terminal Group —R'

| —R' | Symbol |
|---|---|
| —$C_nH_{2n+1}$ | -n |
| —$OC_nH_{2n+1}$ | —On |
| —F | —F |
| —Cl | —CL |
| —$OCF_3$ | —OCF3 |
| —$OCF_2CHFCF_3$ | —OCF2CFHCF3 |
| —CH=$CH_2$ | —V |
| —CH=CH—$C_nH_{2n+1}$ | —Vn |
| —$C_nH_{2n}$—CH=$CH_2$ | -nV |
| —CH=$CF_2$ | —VFF |

3) Bonding Group —Zₙ—

| —Zₙ— | Symbol |
|---|---|
| —$C_2H_4$— | 2 |
| —COO— | E |
| —CH=CH— | V |
| —C≡C— | T |
| —$CF_2O$— | X |

4) Ring Structure —Aₙ—

| Structure | Symbol |
|---|---|
|  | H |
|  | B |
| 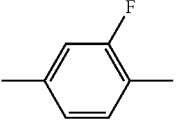 | B(F) |
| 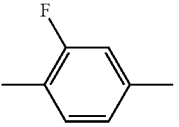 | B(2F) |
| 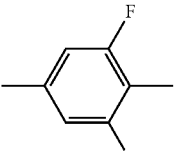 | B(F,F) |
| 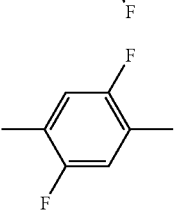 | B(2F,5F) |
| 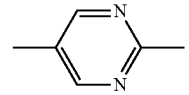 | Py |
| 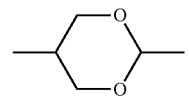 | G |

5) Examples of Description

Example 1  3-BB(F)B(F,F)XB(F,F)—F

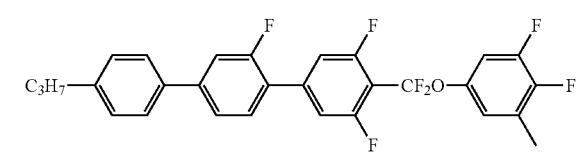

Example 2  3-HH—V

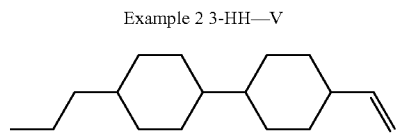

Example 3  3-PyBB—F

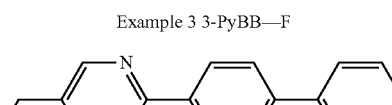

Example 4  3-BB(F,F)XB(F)—OCF3

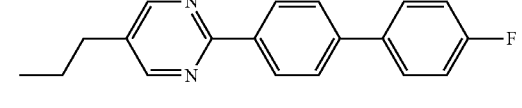

Comparative Example 1

From the compositions disclosed in JP-A-2008-255201, Example 6 was selected. The basis of selection is that the composition contains compound (1-2), and having the highest NI point. The components and characteristics of the composition were as described below.

| Compound | Formula | % |
|---|---|---|
| 3-HHXB(F,F)—F | (1-2-1) | 5% |
| V—HH-3 | (2-1-1) | 30% |
| 3-HH—O1 | (2-1-1) | 5% |
| VFF—HH-3 | (2-1) | 5% |
| V—HHB-1 | (2-4-1) | 10% |
| 3-HHB-1 | (2-4-1) | 4% |
| 3-HHB—O1 | (2-4-1) | 3% |
| 3-HBB-1 | (2-5-1) | 4% |
| 1V2—B(F)BB-1 | (2) | 4% |
| 1V2—B(F)BB-3 | (2) | 4% |
| 3-HHB(F,F)—F | (3-5-1) | 5% |
| 2-BB(F,F)XB(F,F)—F | (3-11-1) | 2% |
| 3-BB(F,F)XB(F,F)—F | (3-11-1) | 6% |
| 3-BB(F,F)XB(F)—OCF3 | (3-12-1) | 8% |
| 4-HBBH—1O1 | (—) | 5% |

NI=85.7° C.; Tc≤−20° C.; Δn=0.101; Δ∈=4.2; Vth=2.04 V; γ1=53 mPa·s; τ=7.2 ms; VHR-1=99.0%; VHR-2=98.2%; VHR-3=98.1%.

Comparative Example 2

From the compositions disclosed in WO2008-102641, Example 9 was selected. The basis of selection is that the composition contains compound (1-1-1-2) in large quantity and compound (1-2). The components and characteristics of the composition were as described below.

| | | |
|---|---|---|
| 3-BB(F)B(F,F)XB(F,F)—F | (1-1-1-2) | 3% |
| 4-BB(F)B(F,F)XB(F,F)—F | (1-1-1-2) | 6% |
| 5-BB(F)B(F,F)XB(F,F)—F | (1-1-1-2) | 5% |
| 3-HHXB(F)—F | (1-2) | 3% |
| 3-HHXB(F)—OCF3 | (1-2) | 3% |
| V—HH-3 | (2-1-1) | 45% |
| 1V—HH-3 | (2-1-1) | 8% |
| 1V2—BB—F | (3-2) | 3% |
| 1V2—BB—CL | (3-3) | 3% |
| V2—BB(F)B-1 | (2-6-1) | 7% |
| V2—BB(F)B-2 | (2-6-1) | 4% |
| V2—BB(F)B-3 | (2-6-1) | 7% |
| 3-HHEBH-3 | (2-7-1) | 3% |

NI=81.3° C.; Tc≤−20° C.; Δn=0.122; Δ∈=2.8; Vth=2.45 V; γ1=48.3 mPa·s; τ=6.6 ms; VHR-1=99.1%; VHR-2=98.1%; VHR-3=98.1%

Example 1

The composition according to Example 1 had a higher NI point, as compared with NI points of the compositions according to Comparative Examples 1 and 2.

| | | |
|---|---|---|
| 4-BB(F)B(F,F)XB(F,F)—F | (1-1-1-2) | 5% |
| 3-HHXB(F,F)—F | (1-2-1) | 10% |
| 2-HHBB(F,F)—F | (1-3-1-1) | 4% |
| 3-HHBB(F,F)—F | (1-3-1-1) | 4% |
| 1V—HH-3 | (2-1-1) | 5% |
| V—HH-4 | (2-1-1) | 5% |
| V—HH-5 | (2-1-1) | 14% |
| V—HHB-1 | (2-4-1) | 12% |
| V2—HHB-1 | (2-4-1) | 4% |
| 2-BB(F)B—2V | (2-6-1) | 3% |
| 5-HB—CL | (3-1-1) | 4% |
| 3-HHB—CL | (3-4-1) | 4% |
| 2-HHB(F,F)—F | (3-5-1) | 3% |
| 3-HHB(F,F)—F | (3-5-1) | 7% |
| 3-HHEB(F,F)—F | (3-6-1) | 5% |
| 3-HBB(F,F)—F | (3-8-1) | 6% |
| 3-BB(F,F)XB(F,F)—F | (3-11-1) | 5% |

NI=102.6° C.; Tc≤−40° C.; Δn=0.102; Δ∈=6.2; Vth=1.81 V; η=17.0 mPa·s; γ1=97 mPa·s; τ=13.6 ms; VHR-1=99.0%; VHR-2=98.2%; VHR-3=98.2%.

Example 2

The composition according to Example 2 had a higher NI point, as compared with NI points of the compositions according to Comparative Examples 1 and 2.

| | | |
|---|---|---|
| 2-BBB(F,F)XB(F,F)—F | (1-1-1-1) | 3% |
| 4-BB(F)B(F,F)XB(F,F)—F | (1-1-1-2) | 6% |
| 5-BB(F,F)XBB(F,F)—F | (1-1-2-1) | 3% |
| 3-B(F)B(F,F)XBB(F,F)—F | (1-1-2-2) | 4% |
| 3-HHXB(F,F)—F | (1-2-1) | 3% |
| 4-HHB(F)B(F,F)—F | (1-3-1-2) | 4% |
| 3-HH2B(F)B(F,F)—F | (1-3-2-2) | 4% |
| V—HH-3 | (2-1-1) | 35% |
| 1V—HH-3 | (2-1-1) | 7% |
| 2-HH-3 | (2-1-1) | 4% |
| V2—BB-1 | (2-3-1) | 3% |
| 3-HBB-2 | (2-5-1) | 3% |
| 2-BB(F)B—2V | (2-6-1) | 3% |
| 5-HB(F)BH-3 | (2-9-1) | 3% |
| 5-HBB(F)B-2 | (2-10-1) | 5% |
| 3-HHB(F,F)—F | (3-5-1) | 4% |
| 3-HGB(F,F)—F | (3-16) | 3% |
| 5-GHB(F,F)—F | (3-17) | 3% |

NI=91.6° C.; Tc≤−30° C.; Δn=0.1110; Δ∈=5.4; Vth=1.81 V; η=14.6 mPa·s; γ1=71 mPa·s; τ=9.8 ms; VHR-1=99.1%; VHR-2=98.2%; VHR-3=98.1%.

Example 3

The composition according to Example 3 had a higher NI point, as compared with NI points of the compositions according to Comparative Examples 1 and 2.

| | | |
|---|---|---|
| 4-BB(F)B(F,F)XB(F,F)—F | (1-1-1-2) | 8% |
| 3-HHXB(F,F)—F | (1-2-1) | 5% |
| 2-HHBB(F,F)—F | (1-3-1-1) | 3% |
| 3-HHBB(F,F)—F | (1-3-1-1) | 4% |
| V—HH-3 | (2-1-1) | 30% |
| 3-HH—O1 | (2-1-1) | 5% |
| VFF—HH-3 | (2-1) | 5% |
| V—HHB-1 | (2-4-1) | 10% |
| V2—HHB-1 | (2-4-1) | 4% |
| 3-HHB-1 | (2-4-1) | 3% |
| 1-BB(F)B—2V | (2-6-1) | 4% |
| 2-BB(F)B—2V | (2-6-1) | 4% |
| 3-HHB(F,F)—F | (3-5-1) | 3% |
| 3-HBB—F | (3-7-1) | 4% |
| 2-BB(F,F)XB(F,F)—F | (3-11-1) | 3% |
| 3-BB(F,F)XB(F,F)—F | (3-11-1) | 5% |

NI=91.0° C.; Tc≤−40° C.; Δn=0.107; Δ∈=4.7; Vth=2.03 V; η=12.5 mPa·s; γ1=65 mPa·s; τ=10.6 ms; VHR-1=99.0%; VHR-2=98.2%; VHR-3=98.1%.

Example 4

The composition according to Example 4 had a higher NI point, as compared with NI points of the compositions according to Comparative Examples 1 and 2.

| | | |
|---|---|---|
| 3-BB(F)B(F,F)XB(F,F)—F | (1-1-1-2) | 3% |
| 4-BB(F)B(F,F)XB(F,F)—F | (1-1-1-2) | 6% |
| 5-BB(F)B(F,F)XB(F,F)—F | (1-1-1-2) | 4% |
| 3-B(F)B(F,F)XBB(F,F)—F | (1-1-2-2) | 3% |
| 3-HHXB(F,F)—F | (1-2-1) | 6% |
| 3-HHBB(F,F)—F | (1-3-1-1) | 4% |
| 4-HHB(F)B(F,F)—F | (1-3-1-2) | 4% |
| 3-HH2BB(F,F)—F | (1-3-2-1) | 4% |
| V—HH-3 | (2-1-1) | 19% |
| 1V—HH-3 | (2-1-1) | 6% |
| V—HH-5 | (2-1-1) | 20% |
| V—HHB-1 | (2-4-1) | 4% |
| 2-BB(F)B-3 | (2-6-1) | 4% |

-continued

| | | |
|---|---|---|
| 1V2—BB—F | (3-2-1) | 3% |
| 3-HHB(F,F)—F | (3-5-1) | 6% |
| 3-HBB(F,F)—F | (3-8-1) | 4% |

NI=91.0° C.; Tc≤−20° C.; Δn=0.105; Δ∈=6.1; Vth=1.80 V; η=12.5 mPa·s; γ1=77 mPa·s; τ=12.5 ms; VHR-1=99.1%; VHR-2=98.2%; VHR-3=98.1%.

Example 5

The composition according to Example 5 had a higher NI point, as compared with NI points of the compositions according to Comparative Examples 1 and 2.

| | | |
|---|---|---|
| 4-BB(F)B(F,F)XB(F,F)—F | (1-1-1-2) | 4% |
| 5-BB(F,F)XB(F)B(F,F)—F | (1-1-2-3) | 3% |
| 5-B(F)B(F,F)XB(F)B(F,F)—F | (1-1-2-4) | 3% |
| 3-HHXB(F,F)—F | (1-2-1) | 15% |
| 3-HHBB(F,F)—F | (1-3-1-1) | 3% |
| 3-HH2BB(F,F)—F | (1-3-2-1) | 3% |
| 3-HH2B(F)B(F,F)—F | (1-3-2-2) | 3% |
| V—HH-3 | (2-1-1) | 35% |
| 1V—HH-3 | (2-1-1) | 6% |
| 2-BB(F)B-5 | (2-6-1) | 5% |
| 3-HHEBH-3 | (2-7-1) | 3% |
| 5-HBBH-3 | (2-8-1) | 3% |
| 3-BB(F)B(F,F)—F | (3-9-1) | 5% |
| 3-HBEB(F,F)—F | (3-15-1) | 3% |
| 5-HBEB(F,F)—F | (3-15-1) | 3% |
| 5-HBBH—1O1 | (—) | 3% |

NI=102.8° C.; Tc≤−40° C.; Δn=0.099; Δ∈=6.7; Vth=1.60 V; η=15.2 mPa·s; γ1=98 mPa·s; τ=15.4 ms; VHR-1=99.1%; VHR-2=98.2%; VHR-3=98.1%.

Example 6

The composition according to Example 6 had a higher NI point, as compared with NI points of the compositions according to Comparative Examples 1 and 2.

| | | |
|---|---|---|
| 4-BB(F)B(F,F)XB(F,F)—F | (1-1-1-2) | 5% |
| 3-HHXB(F,F)—F | (1-2-1) | 5% |
| 2-HHBB(F,F)—F | (1-3-1-1) | 4% |
| 3-HHBB(F,F)—F | (1-3-1-1) | 4% |
| 3-HH2B(F)B(F,F)—F | (1-3-2-2) | 4% |
| V—HH-5 | (2-1-1) | 10% |
| 7-HB-1 | (2-2-1) | 3% |
| 3-HB-O2 | (2-2-1) | 3% |
| 5-HB-O2 | (2-2-1) | 3% |
| V2—BB-1 | (2-3-1) | 3% |
| 2-BB(F)B-5 | (2-6-1) | 4% |
| 5-HBBH-3 | (2-8-1) | 3% |
| 5-HB(F)BH-3 | (2-9-1) | 3% |
| 5-HBB(F)B-2 | (2-10-1) | 4% |
| 5-HB—CL | (3-1-1) | 10% |
| 1V2—BB—CL | (3-3-1) | 3% |
| 3-HHB—CL | (3-4-1) | 4% |
| 5-HHB—CL | (3-4-1) | 3% |
| 3-HHEB(F,F)—F | (3-6-1) | 10% |
| 3-PyBB—F | (3-10-1) | 3% |
| 3-BB(F,F)XB(F,F)—F | (3-11-1) | 5% |
| 3-BB(F,F)XB(F)—OCF3 | (3-12-1) | 4% |

NI=105.6° C.; Tc≤−40° C.; Δn=0.130; Δ∈=7.1; Vth=1.93 V; η=24.1 mPa·s; γ1=142 mPa·s; η=11.45 ms; VHR-1=99.1%; VHR-2=98.2%; VHR-3=98.1%.

INDUSTRIAL APPLICABILITY

The invention provides a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat, or a liquid crystal composition having a suitable balance regarding at least two of the characteristics. A liquid crystal display device containing such a liquid crystal composition produces an AM device having a short response time, a large voltage holding ratio, a large contrast ratio, a long service life and so forth, and thus the device can be used for a liquid crystal projector, a liquid crystal television and so forth.

What is claimed is:

1. A liquid crystal composition has a nematic phase comprising a mixture of a least one compound selected from the group of compounds represented by formula (1-1-1), at least one compound selected from the group of compounds represented by and formula (1-1-2), at least one compound selected from the group of compounds represented by formula (1-2), and at least one compound selected from the group of compounds represented by formula (1-3-1) and formula (1-3-2) as a first component, and at least one compound selected from the group of compounds represented by formula (2) as a second component:

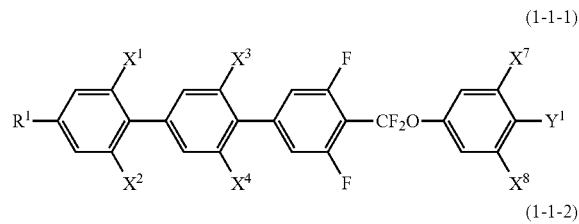

(1-1-1)

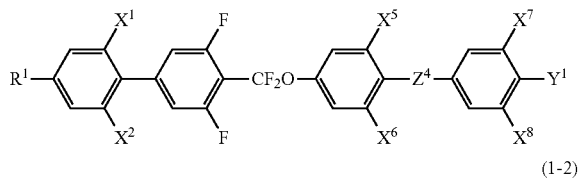

(1-1-2)

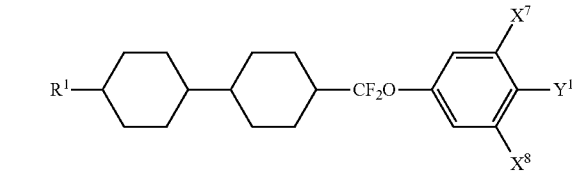

(1-2)

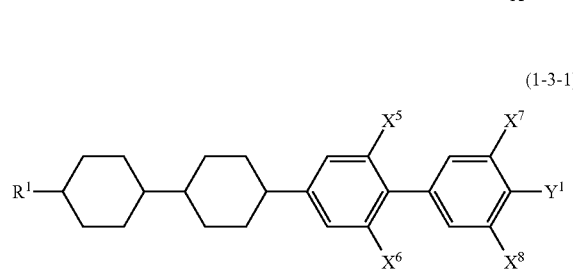

(1-3-1)

(1-3-2)

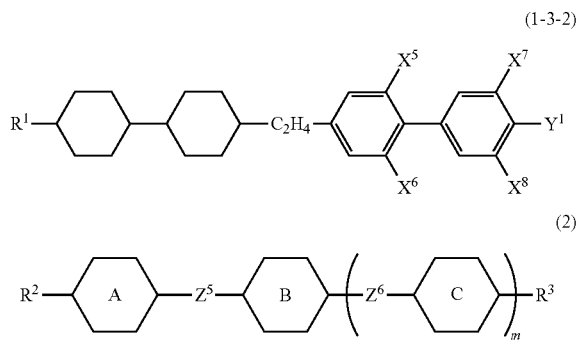

(2)

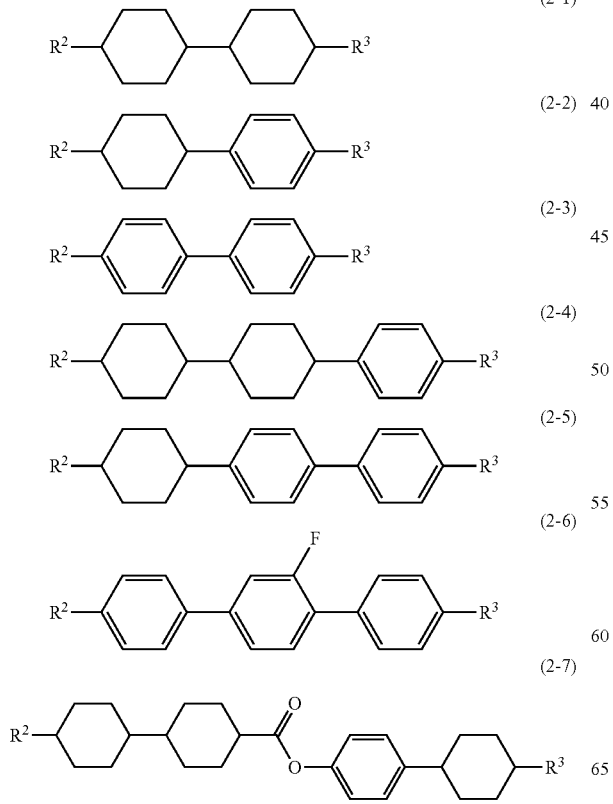

wherein $R^1$ is alkyl having 1 to 12 carbons, alkoxy having 1 to 12 carbons or alkenyl having 2 to 12 carbons; $R^2$ and $R^3$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring A, ring B and ring C are independently 1,4-cyclohexylene, 1,4-phenylene, 2-fluoro-1,4-phenylene or 2,5-difluoro-1,4-phenylene; $Z^5$ and $Z^6$ are independently a single bond, ethylene or carbonyloxy; $X^1, X^2, X^3, X^4, X^5, X^6, X^7$ and $X^8$ are independently hydrogen or fluorine; and $Y^1$ is fluorine, chlorine or trifluoromethoxy; and m is 0, 1 or 2.

2. The liquid crystal composition according to claim 1, wherein the second component is at least one compound selected from the group of compounds represented by formula (2-1) to formula (2-10):

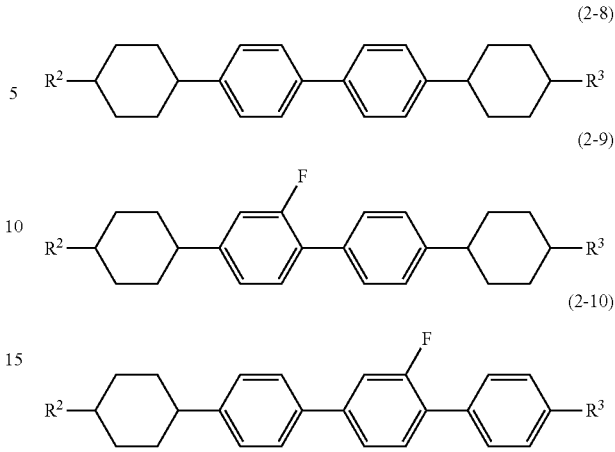

(2-8)

(2-9)

(2-10)

wherein $R^2$ and $R^3$ are alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

3. The liquid crystal composition according to claim 2, wherein the second component is at least one compound selected from the group of compounds represented by formula (2-1).

4. The liquid crystal composition according to claim 2, wherein the second component is a mixture of at least one compound selected from the group of compounds represented by formula (2-6) and at least one compound selected from the group of compounds represented by formula (2-10).

5. The liquid crystal composition according to claim 1, wherein a ratio of the first component is in the range of 5% by weight to 65% by weight, and a ratio of the second component is in the range of 35% by weight to 85% by weight, based on the total weight of the liquid crystal composition.

6. The liquid crystal composition according to claim 1, further containing at least one compound selected from the group of compounds represented by formula (3) as a third component:

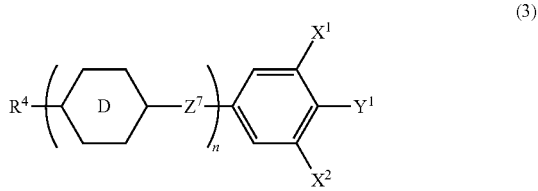

(3)

wherein $R^4$ is alkyl having 1 to 12 carbons or alkenyl having 2 to 12 carbons; ring D is independently 1,4-cyclohexylene, 1,3-dioxane-2,5-diyl, 1,4-phenylene, 2-fluoro-1,4-phenylene, 2,6-difluoro-1,4-phenylene or 2,5-pyrimidine; $Z^7$ is independently a single bond, ethylene, carbonyloxy or difluoromethyleneoxy; $X^1$ and $X^2$ are independently hydrogen or fluorine; $Y^1$ is fluorine, chlorine or trifluoromethoxy; and n is 1 or 2, wherein when n is 2 and both of $Z^7$ are a single bond, at least one of ring D is 1,3-dioxane-2,5-diyl, 1,4-phenylene, 2-fluoro-1,4-phenylene, 2,6-difluoro-1,4-phenylene or 2,5-pyrimidine, and when n is 2 and at least one of $Z^7$ is not a single bond, at least one of ring D is 1,4-phenylene, 2-fluoro-1,4-phenylene or 2,6-difluoro-1,4-phenylene.

7. The liquid crystal composition according to claim 6, wherein the third component is at least one compound selected from the group of compounds represented by formula (3-1) to formula (3-12):

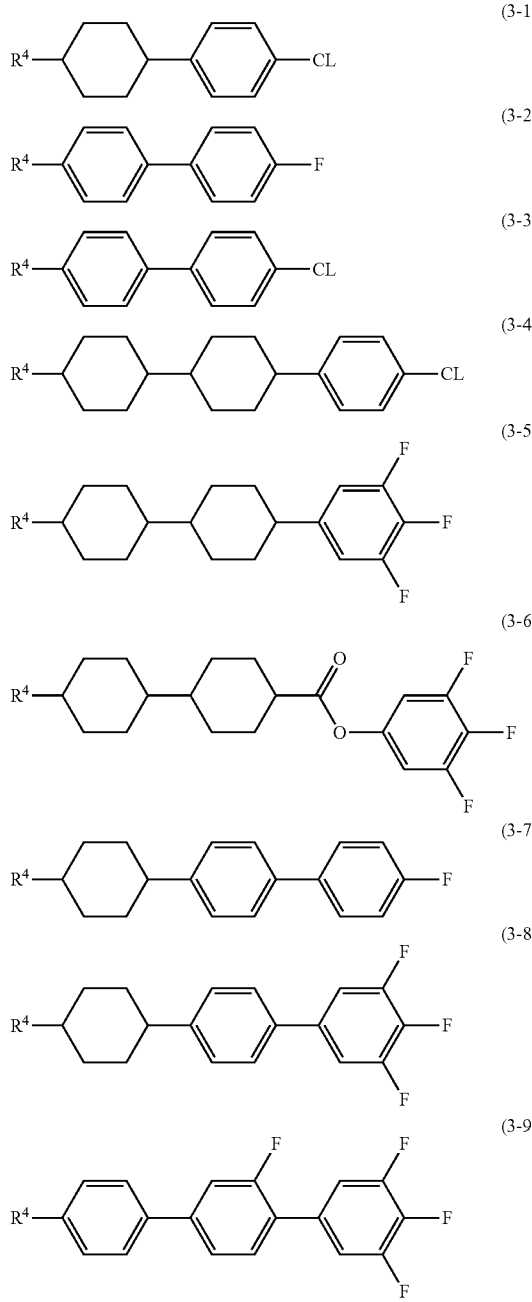

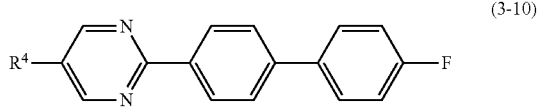

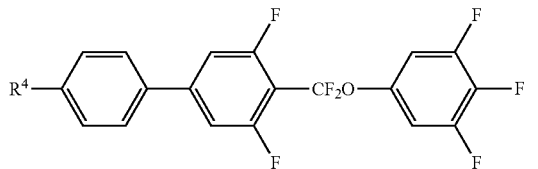

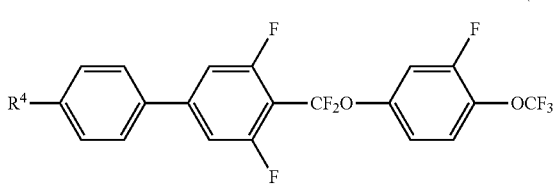

wherein $R^4$ is alkyl having 1 to 12 carbons or alkenyl having 2 to 12 carbons.

8. The liquid crystal composition according to claim 7, wherein the third component is at least one compound selected from the group of compounds represented by formula (3-9).

9. The liquid crystal composition according to claim 7, wherein the third component is at least one compound selected from the group of compounds represented by formula (3-10).

10. The liquid crystal composition according to claim 6, wherein a ratio of the third component is in the range of 5% by weight to 40% by weight, based on the total weight of the liquid crystal composition.

11. The liquid crystal composition according to claim 1, wherein a maximum temperature of the nematic phase is 70° C. or higher, an optical anisotropy (25° C.) at a wavelength of 589 nanometers is 0.08 or more and a dielectric anisotropy (25° C.) at a frequency of 1 kHz is 2 or more.

12. A liquid crystal display device, containing the liquid crystal composition according to claim 1.

13. The liquid crystal display device according to claim 12, wherein an operating mode of the liquid crystal display device is a TN mode, an OCB mode, an IPS mode or a PSA mode, and a driving mode of the liquid crystal display device is an active matrix mode.

* * * * *